Patented July 22, 1924.

1,502,207

UNITED STATES PATENT OFFICE.

HOWARD S. PAINE, OF CHEVY CHASE, MARYLAND, AND JOHN HAMILTON, OF WASHINGTON, DISTRICT OF COLUMBIA, DEDICATED, BY MESNE ASSIGNMENTS, TO THE CITIZENS OF THE UNITED STATES OF AMERICA.

PROCESS FOR PREPARING CONFECTIONS COATED WITH FONDANT.

No Drawing. Application filed March 4, 1924. Serial No. 696,886.

(FILED UNDER THE ACT OF MARCH 3, 1883, 22 STAT. L., 625.)

*To all whom it may concern:*

Be it known that we, HOWARD S. PAINE and JOHN HAMILTON, citizens of the United States of America, and employees of the Department of Agriculture of the United States of America, residing, respectively, at Chevy Chase, Maryland, and Washington, District of Columbia, have jointly invented a new and useful Process for Preparing Confections Coated with Fondant, of which the following is a specification.

This application is made under the act of March 3, 1883, chapter 143 (22 Stat., 625), and the invention herein described and claimed may be used by the Government of the United States, its officers and employees, and by any person in the United States either in public or private work without payment to us of any royalty thereon.

In the art of manufacturing bonbons it is customary to coat a center consisting of various types of material with a fondant composed of sucrose alone or sucrose mixed with corn sirup or other ingredients. This fondant coating, as well as the center, is frequently flavored and colored. Owing to the large proportion of sucrose in the fondant coating, the salable life of such goods is short, due to rapid crystallization of sucrose with consequent production of unsightly spots in the coating. This change is also accompanied by rapid evaporation of moisture from the goods, owing to the fact that the fondant coating is rather porous and does not retard evaporation in the same degree, for instance, as a coating of chocolate.

We have discovered that by adding invertase to the dipping fondant used for producing the fondant coating, a sufficient degree of inversion of the sucrose is thereby produced to greatly retard crystallization of sucrose, thereby preventing the unsightly spots above mentioned. The production of invert sugar in the edible coating in this manner also results in diminishing the degree of porosity of the fondant coating, thereby diminishing the rate of evaporation of moisture and the drying out of the goods.

An invertase preparation of any convenient strength may be employed, but in our work we have been accustomed to use an invertase preparation of constant and standardized activity, said activity being determined as follows: 5 grams of the invertase solution are dissolved in water, and diluted with water to a volume of one liter. 20 cubic centimeters of this dilute solution are added to 200 cubic centimeters of a 10% sucrose solution. This mixture is then acidified with 5 drops of glacial acetic acid. During inversion the solution is kept at a constant temperature of 25° C. Portions of the solution are removed from time to time, and after being made very slightly alkaline with sodium carbonate, the polarization is determined by means of a saccharimeter. The unimolecular reaction velocity constant $K$, as calculated from the polarizations, should be 0.0022–0.0023 for the standard invertase preparation which we have been accustomed to employ. Other invertase preparations of different and varying strengths may of course be used, and we merely cite the foregoing as an illustration of the manner in which we have controlled the process.

For ordinary work, we have found the addition of 10 to 15 cubic centimeters of invertase of the foregoing strength per 100 lbs. of dipping fondant produces satisfactory results. This proportion may be varied, however, according to determining conditions, such as composition of the dipping fondant, temperature at which the dipping fondant is melted, etc.

We have also found that the effect of invertase as above described may in some cases be improved by warming the fondant-coated goods to a temperature ranging from 80° to 120° F. for a period ranging from 10 or 15 min. to an hour. This treatment permits the production of an exceedingly thin crust on the surface of the fondant coating, which still further retards evaporation of moisture. This operation of warming the goods may be performed at varying periods after application of the fondant coating. The gloss of the goods may be further improved by increasing for a comparatively short time the humidity of the atmosphere in which the goods are warmed.

In order to retard drying out of the center, and also in order to give the center essentially the same consistency as the fondant coating, we find it advantageous to also add invertase to the center, as provided for in U. S. Patent No. 1,437,816, issued to us on December 5, 1922. The proportion of invertase of the strength above mentioned which we generally employ is ordinarily 20 to 30 cubic centimeters per 100 lbs. of fondant in the center. However, this proportion may be varied to suit different conditions.

The composition of the centers and fondant coating may be such as are customarily employed in practice, and their composition and manner of preparation do not constitute any part of this invention. The process which we have described may obviously be applied to any type of confection which is coated with a fondant, or preparation containing fondant.

Having thus described our invention, we claim—

1. A confection with a fondant coating containing invertase.

2. A procedure for preparing a fondant-coated confection wherein invertase is added to the fondant coating.

3. A procedure for preparing a fondant-coated confection, wherein invertase is added to the fondant coating and the confection is warmed to a temperature of 80° to 120° F.

4. A procedure for preparing a fondant-coated confection, wherein invertase is added to the fondant coating and the confection is warmed to a temperature of 80° to 120° F., with addition of water vapor to increase the humidity of the atmosphere during heating.

5. A confection with a center and fondant coating, both of which contain invertase.

6. A procedure for preparing a fondant-coated confection wherein invertase is added both to the fondant coating and the center.

7. A procedure for preparing a fondant-coated confection wherein invertase is added both to the fondant coating and the center, and the confection is warmed to a temperature of 80° to 120° F.

8. A procedure for preparing a fondant-coated confection wherein invertase is added both to the fondant coating and the center, and the confection is warmed to a temperature of 80° to 120° F., with addition of water vapor to increase the humidity of the atmosphere during heating.

HOWARD S. PAINE.
JOHN HAMILTON.